United States Patent
Sturzu et al.

(10) Patent No.: US 10,324,204 B1
(45) Date of Patent: Jun. 18, 2019

(54) DIFFRACTION IMAGING SYSTEMS AND METHODS USING SPECULARITY GATHERS

(71) Applicant: Z TERRA INC., Houston, TX (US)

(72) Inventors: Ioan Sturzu, Houston, TX (US); Alexander M. Popovici, Katy, TX (US); Tijmen J. Moser, The Hague (NL); Iulian F. Musat, Katy, TX (US); Nicolay Tanushev, Houston, TX (US)

(73) Assignee: Z TERRA INC., Houston, TX (US)

( * ) Notice: Subject to any disclaimer, the term of this patent is extended or adjusted under 35 U.S.C. 154(b) by 1024 days.

(21) Appl. No.: 14/337,120

(22) Filed: Jul. 21, 2014

Related U.S. Application Data

(60) Provisional application No. 61/856,225, filed on Jul. 19, 2013, provisional application No. 61/856,231, filed on Jul. 19, 2013.

(51) Int. Cl.
*G01V 1/28* (2006.01)

(52) U.S. Cl.
CPC .................................... *G01V 1/28* (2013.01)

(58) Field of Classification Search
CPC ................................ G01V 1/28; G01V 1/307
See application file for complete search history.

(56) References Cited

U.S. PATENT DOCUMENTS

| | | | |
|---|---|---|---|
| 2005/0219949 A1 | 10/2005 | Taner et al. | |
| 2014/0293744 A1* | 10/2014 | Zhang | G01V 1/28 367/53 |

OTHER PUBLICATIONS

Zhang et al., Efficient reflection tomography with ray take-off directions collected from beam migration, Nov. 2012, SEG Las Vegas 2012 Annual Meeting, pp. 1-5 (Year: 2012).*
USPTO, Office Action dated Sep. 27, 2016 for U.S. Appl. No. 14/337,116, filed Jul. 21, 2014.
Fomel, Sergey, "Applciations of plane-wave destruction filters," Geophysics vol. 67 No. 6, pp. 1946-1960, Society of Exploration Geophysicists, Tulsa, Oklahoma, Nov. 2002.
Khaidukov et al., "Diffraction imaging by focusing-defocusing: An outlook on seismic superresolution," Geophysics vol. 69 No. 6, pp. 1478-1490, Society of Exploration Geophysicists, Tulsa, Oklahoma, Nov. 2004.

(Continued)

*Primary Examiner* — Sujoy K Kundu
*Assistant Examiner* — Liam R Casey
(74) *Attorney, Agent, or Firm* — Law Office of Andrei D Popovici, PC

(57) ABSTRACT

In some embodiments, a seismic processing method comprises assembling a specularity gather by determining a specularity value at each of a plurality of subsurface locations, and summing trace amplitudes into a plurality of bins, each bin characterized by a range of specularity values. The specularity value at a subsurface location is computed according to an angle between a normal to a local reflector and a direction of a total (source+receiver) traveltime gradient. For example, the specularity may be proportional to (e.g. equal to) a magnitude of the cosine of the angle. A diffraction image may be generated by summing specularity gather data over specularity, with specular event amplitudes attenuated relative to diffractive event amplitudes.

15 Claims, 19 Drawing Sheets

(56) References Cited

OTHER PUBLICATIONS

Shtivelman et al., "Imaging shallow subsurface inhomogeneities by 3D multipath diffraction summation," First Break vol. 23, pp. 39-42, European Association of Geoscientists and Engineers, Houten, Netherlands, Jan. 2005.

Fomel et al., "Post-stack velocity analysis by separation and imaging of seismic diffractions," Proceedings of the 76th Annual International Meeting of the Society of Exploration Geophysicists, pp. 2559-2563a, New Orleans, Louisiana, Oct. 2006.

Taner et al., "Separation and imaging of seismic diffractions using plane-wave decomposition," Proceedings of the 76th Annual International Meeting of the Society of Exploration Geophysicists, pp. 2401-2405, New Orleans, Louisiana, Oct. 2006.

Landa et al., "Separation, imaging, and velocity analysis of seismic diffractions using migrated dip-angle gathers," 78th Annual International Meeting of the Society of Exploration Geophysicists, pp. 2176-2180, Las Vegas, Nevada, Nov. 2008.

Moser et al., "Diffraction imaging in depth," Geophysical Prospecting vol. 56, pp. 627-641, European Association of Geoscientists and Engineers, Houten, Netherlands, Nov. 2008.

Zeng, Hongliu, "How thin is a thin bed? An alternative perspective," The Leading Edge vol. 28 Issue 10, pp. 1192-1197, Society of Exploration Geophysicists, Tulsa, Oklahoma, Oct. 2009.

Moser, T.J. "Diffraction Imaging in Subsalt Geometries and a New Look at the Scope of Reflectivity," Subsalt Imaging Workshop: Focus on Azimuth, pp. 1-5, European Association of Geoscientists and Engineers, Cairo, Egypt, Nov. 15-18, 2009.

Koren et al., "Specular-diffraction Imaging by Directional Angle Decomposition," 72nd European Association of Geoscientists and Engineers Conference & Exhibition incorporating the Society of Petroleum Engineers EUROPEC 2010, pp. 1-5, Barcelona, Spain, Jun. 2010.

Klokov et al., "Diffraction imaging for fracture detection: synthetic case study," Proceedings of the 80th Annual Meeting of the Society of Exploration Geophysicists, pp. 3354-3358, Denver, Colorado, Oct. 2010.

Koren et al., "Full-azimuth subsurface angle domain wavefield decomposition and imaging Part I: Directional and reflection image gathers," Geophysics vol. 76 No. 1, pp. S1-S13, Society of Exploration Geophysicists, Tulsa, Oklahoma, Jan. 2011.

Klokov et al., "Point and edge diffractions in three dimensions," 73rd European Association of Geoscientists and Engineers Conference & Exhibition incorporating the Society of Petroleum Engineers EUROPEC 2011, pp. 1-5, Vienna, Austria, May 2011.

Moser, T.J., "Edge and tip diffraction imaging in three dimensions," 73rd European Association of Geoscientists and Engineers Conference & Exhibition incorporating the Society of Petroleum Engineers EUROPEC 2011, pp. 1-5, Vienna, Austria, May 2011.

Dell et al., "Common-reflection-surface-based workflow for diffraction imaging," Geophysics vol. 76 No. 5, pp. S187-S197, Society of Exploration Geophysicists, Tulsa, Oklahoma, Sep. 2011.

Moser, T.J., "Review of ray-Born forward modeling for migration and diffraction analysis," Studia Geophysica et Geodaetica vol. 56 Issue 2, pp. 411-432, Institute of Geophysics of the Academy of Sciences of the Czech Republic, Prague, Czech Republic, Mar. 2012.

Z-Terra et al., "Eagleford/Kenedy Diffraction Imaging," Z-Terra Inc., Houston, Texas, Apr. 2012.

Klokov et al., "Separation and imaging of seismic diffractions using migrated dip-angle gathers," Geophysics vol. 77 No. 6, pp. S131-S143, Society of Exploration Geophysicsts, Tulsa, Oklahoma, Nov. 2012.

Popovici et al., "High Resolution Diffraction Imaging of Small Scale Fractures in the Eagle Ford Unconventional Shale Play," Society of Independent Professional Earth Scientists Houston Chapter Newsletter, pp. 1-4, Society of Independent Professional Earth Scientists, Dallas, Texas, Dec. 2012.

Sturzu et al., "Specularity Gathers for Diffraction Imaging," 75th European Association of Geoscientists and Engineers Conference & Exhibition incorporating the Society of Petroleum Engineers EUROPEC 2013, pp. 1-5, London, United Kingdom, Jun. 2013.

Sturzu et al., "Diffraction Imaging Using Plane-wave Destructor Filters in Common-depth Specularity Gathers," 7th Congress of Balkan Geophysical Society, pp. 1-5, Tirana, Albania, Oct. 2013.

Popovici et al., "Method Images Small-Scale Fractures," The American Oil & Gas Reporter, pp. 1-4, National Publishers Group Inc., Haysville, Kansas, Jan. 2014.

Sturzu et al., "Diffraction Imaging using Specularity Gathers," Journal of Seismic Exploration vol. 23 No. 1, pp. 1-18, Geophysical Press Ltd., Benahavis, Spain, Feb. 2014.

Veenhof et al., "Diffraction Imaging in the North Sea, Case Study Over the Dutch Q16 Fields," 76th European Association of Geoscientists and Engineers Conference & Exhibition 2014, pp. 1-5, Amsterdam, The Netherlands, Jun. 2014.

Popovici et al., U.S. Appl. No. 14/337,116, filed Jul. 21, 2014.

* cited by examiner

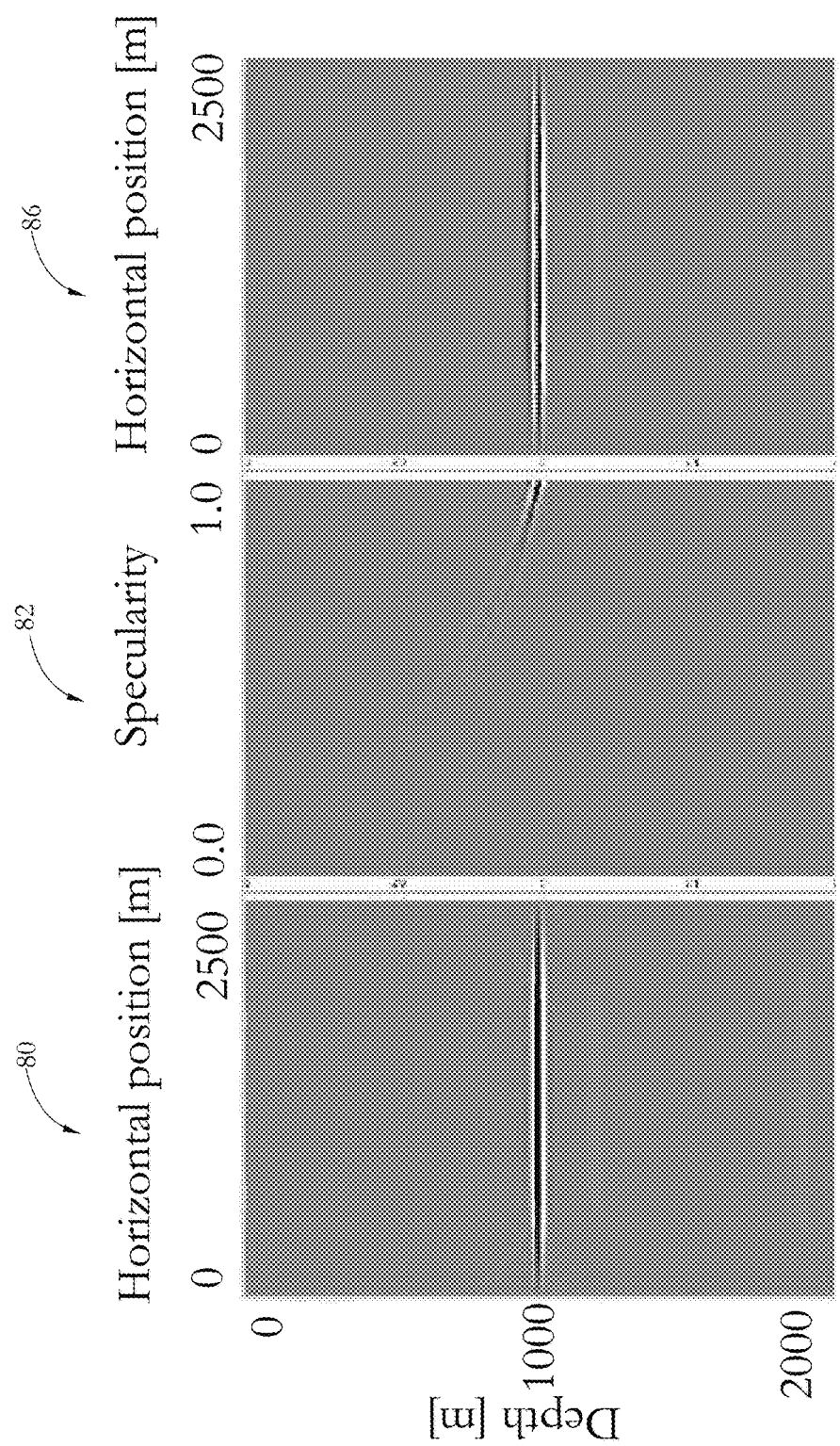
FIG. 7-A

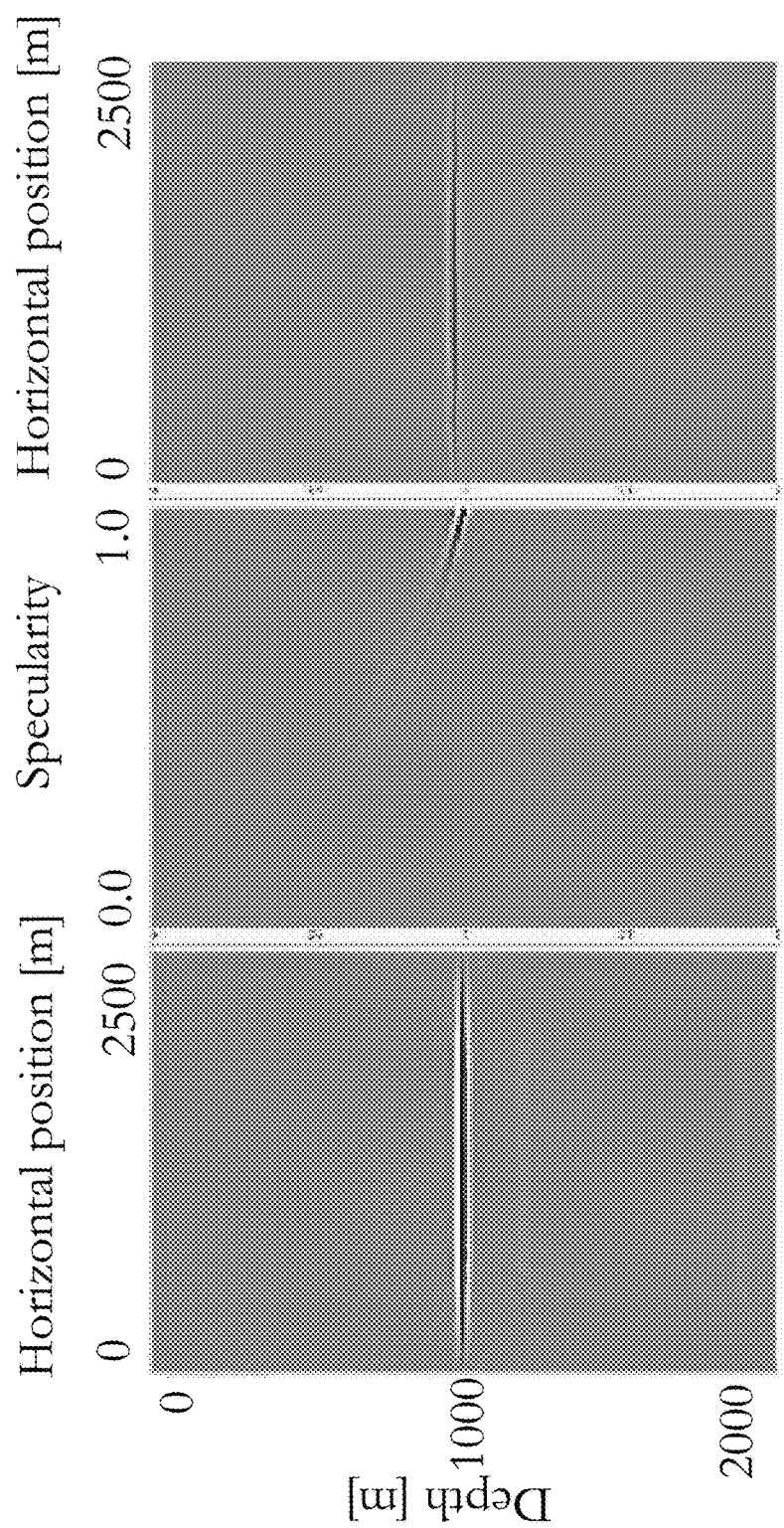
FIG. 7-B

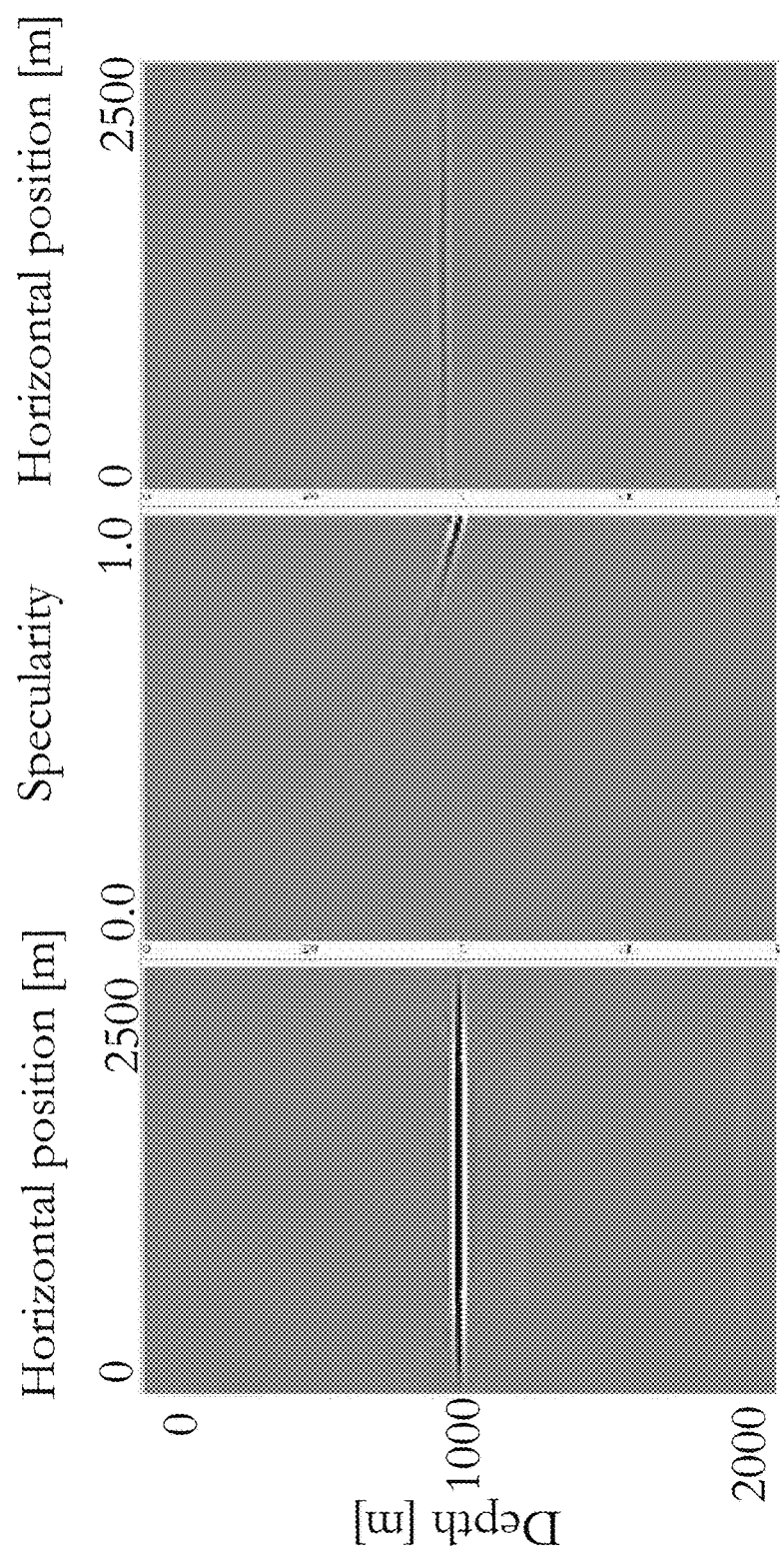
FIG. 7-C

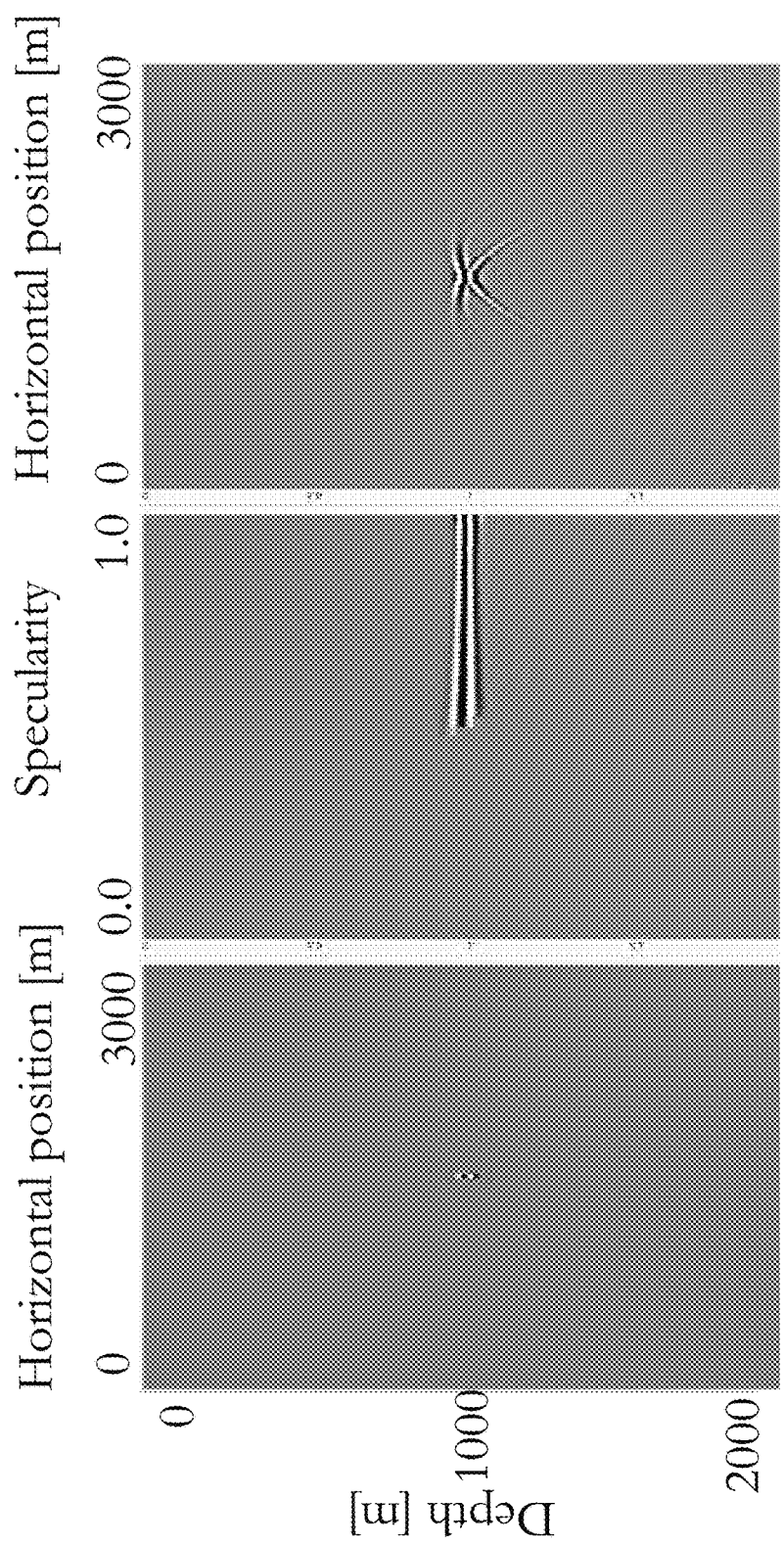
FIG. 8-A

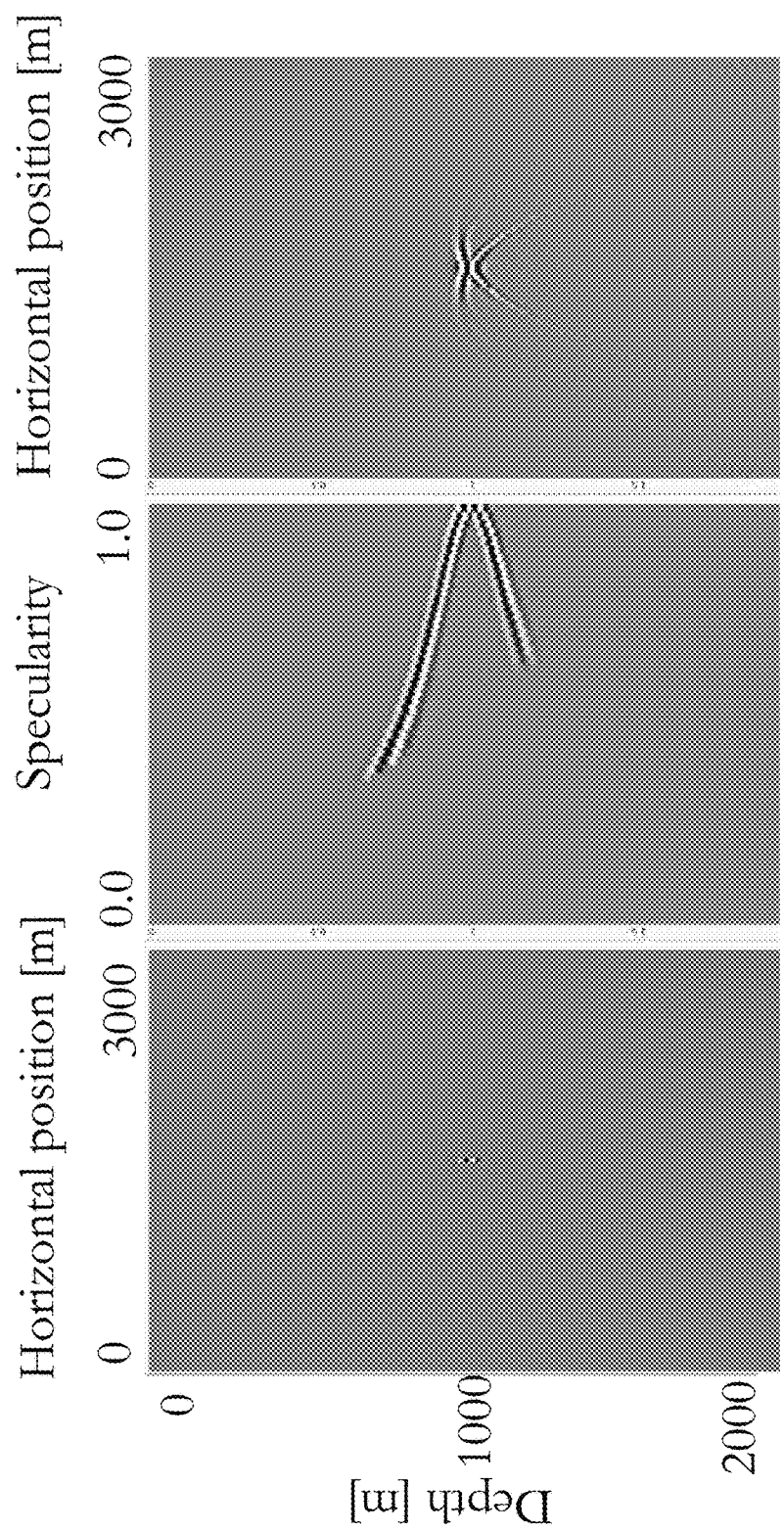
FIG. 8-B

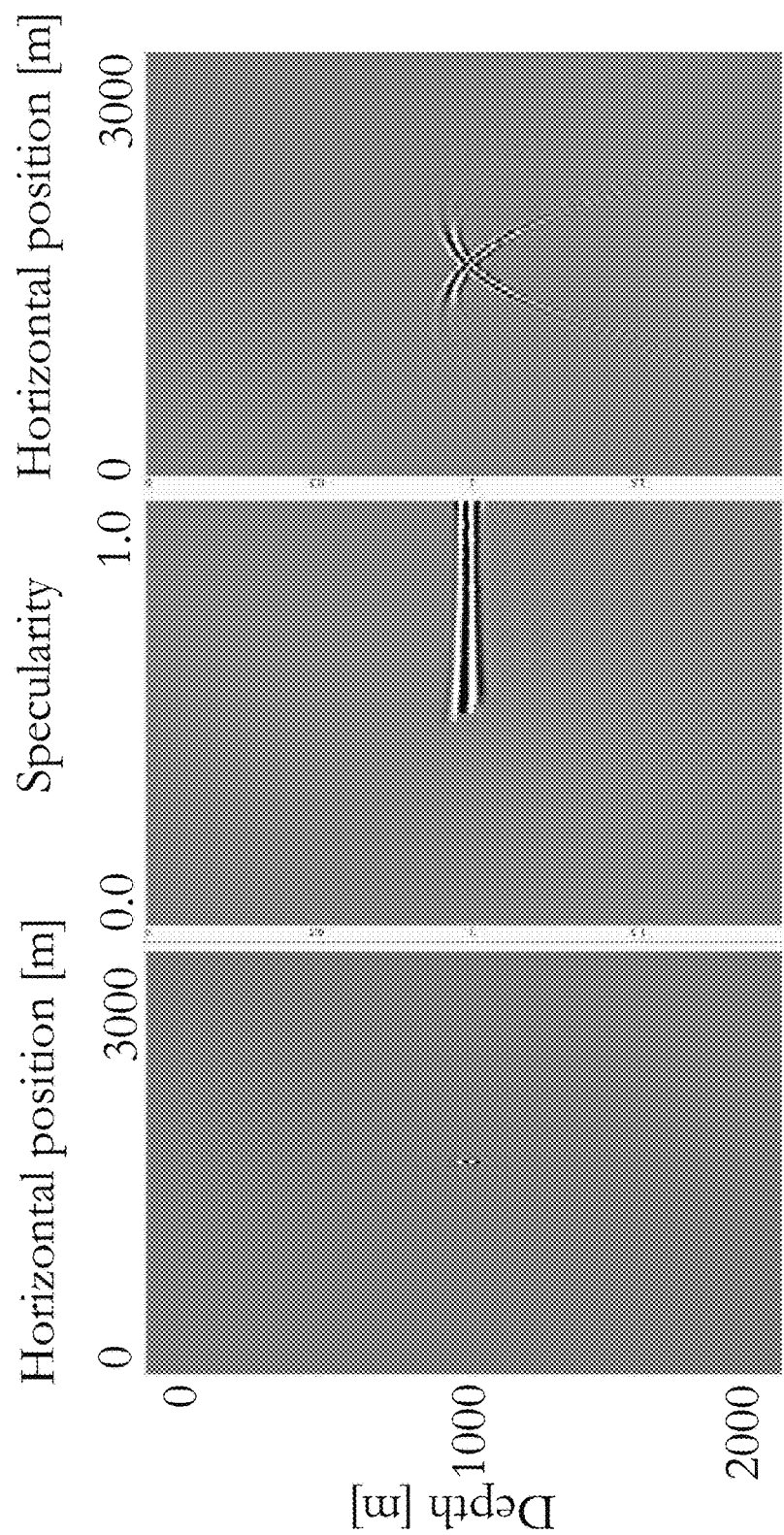
FIG. 8-C

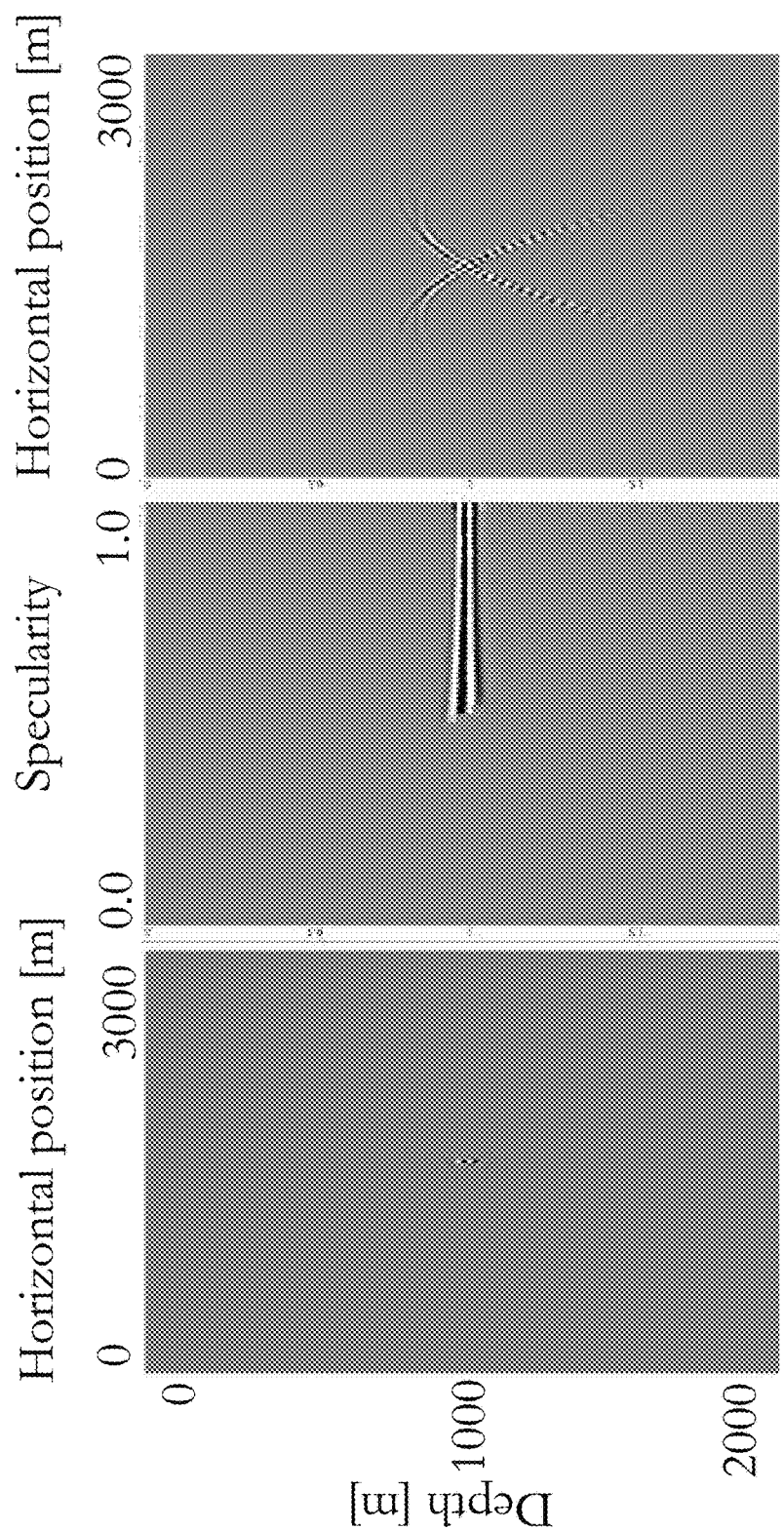
FIG. 8-D

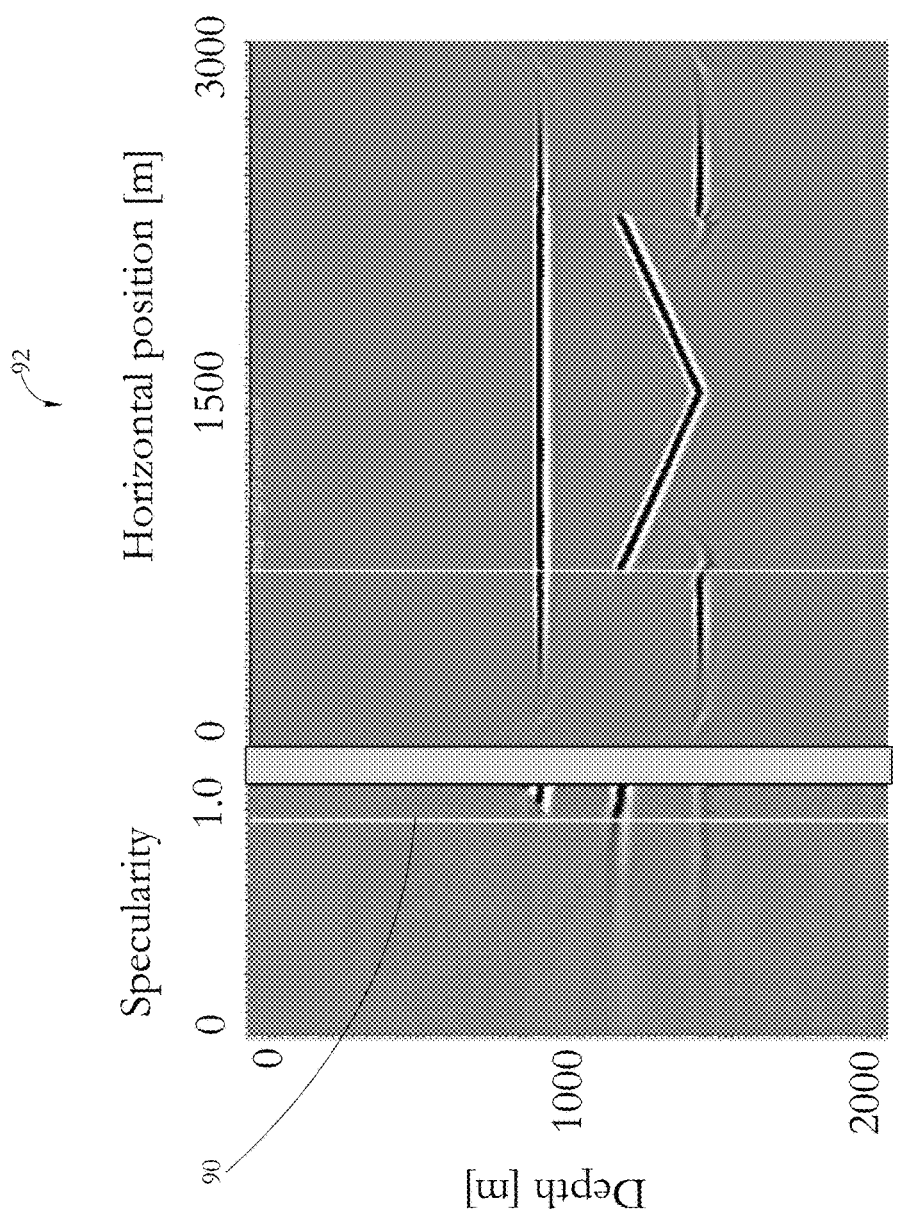
FIG. 9-A

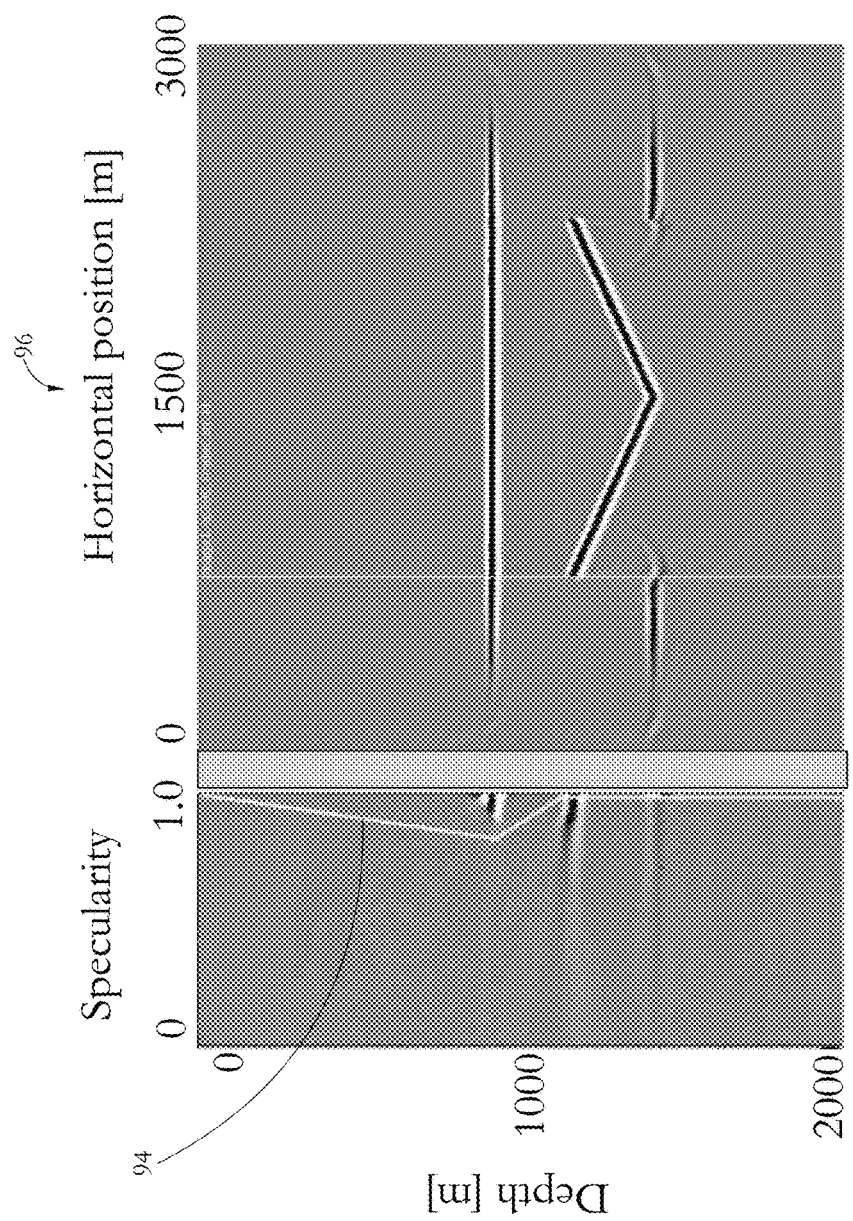
FIG. 9-B

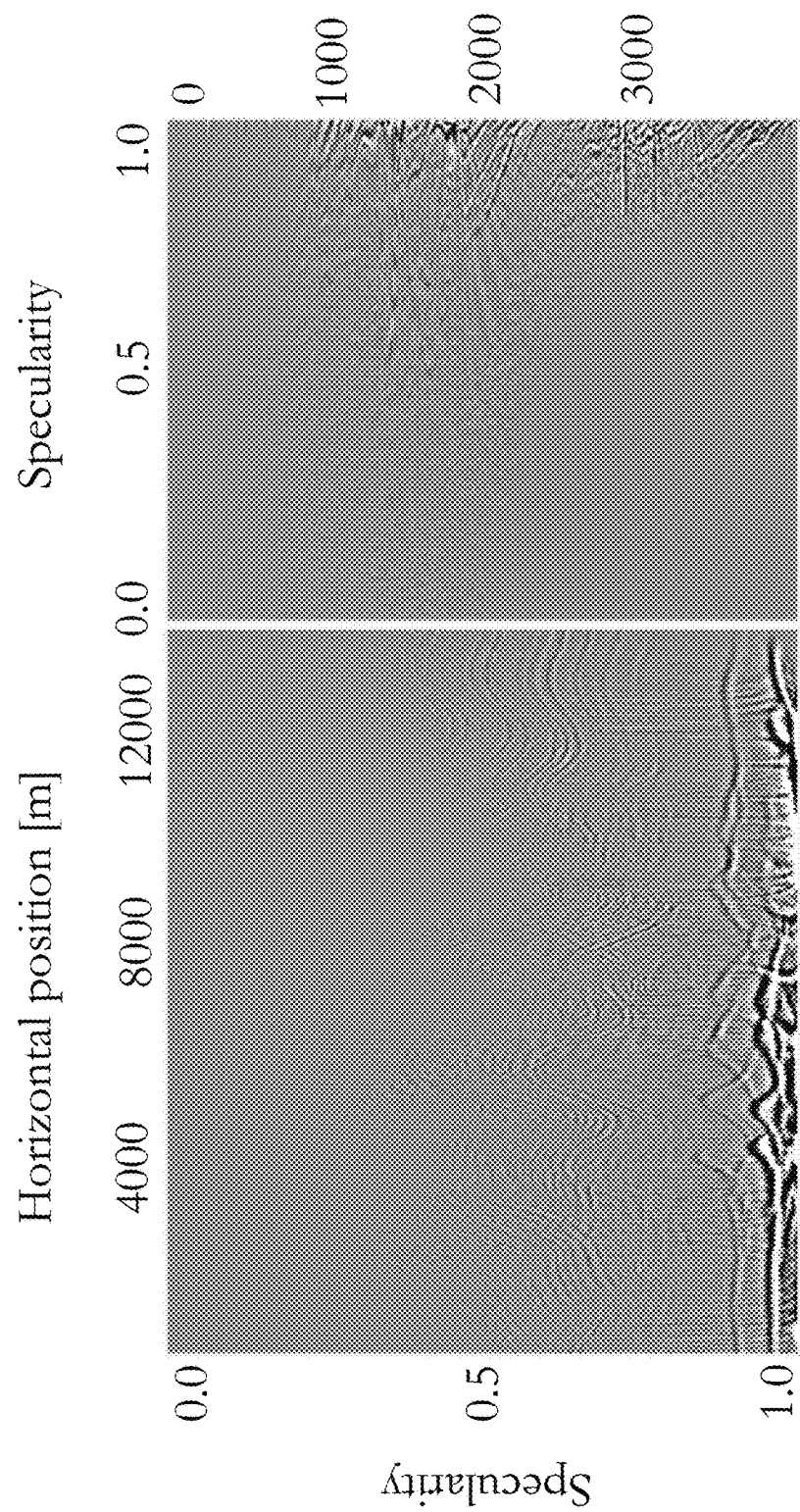
FIG. 10-A

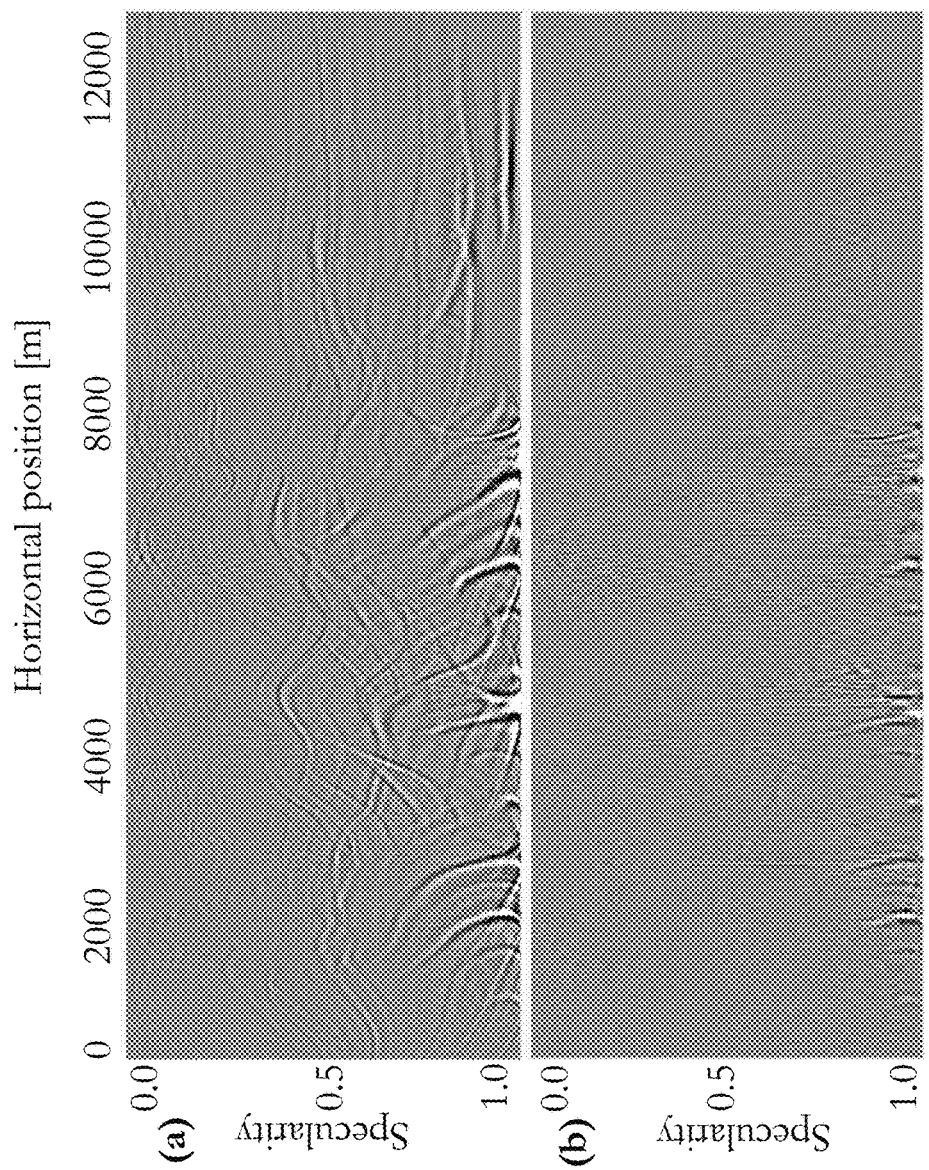
FIG. 10-B

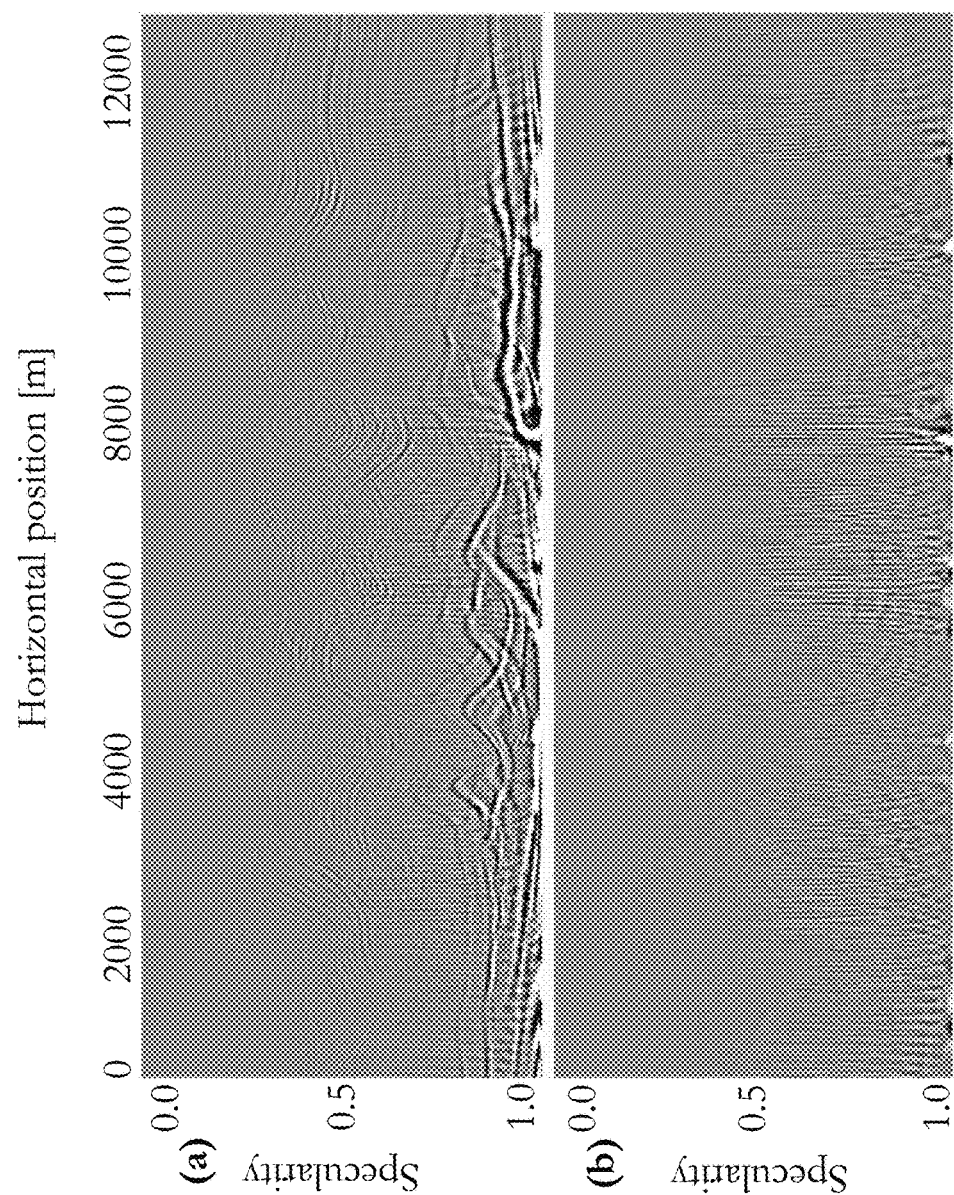
FIG. 10-C

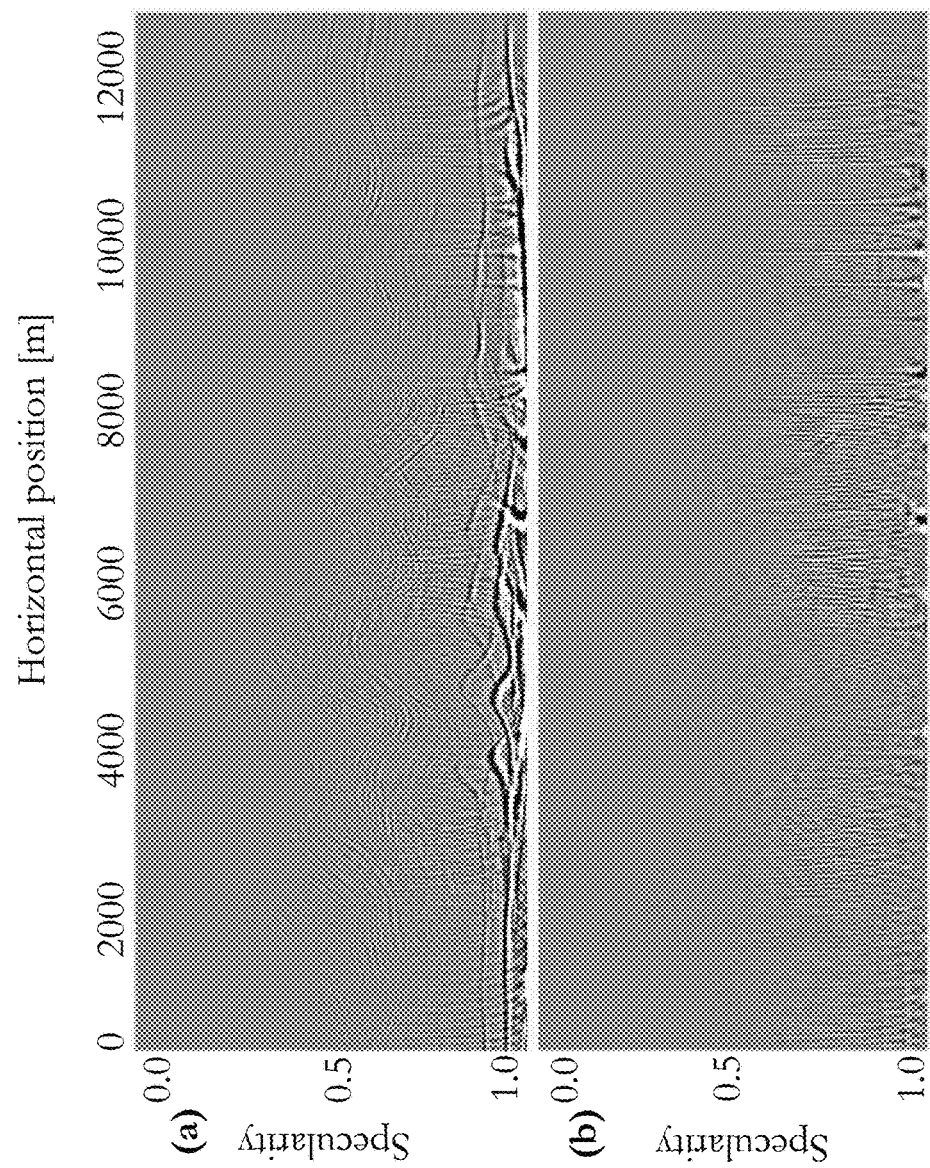
FIG. 10-D

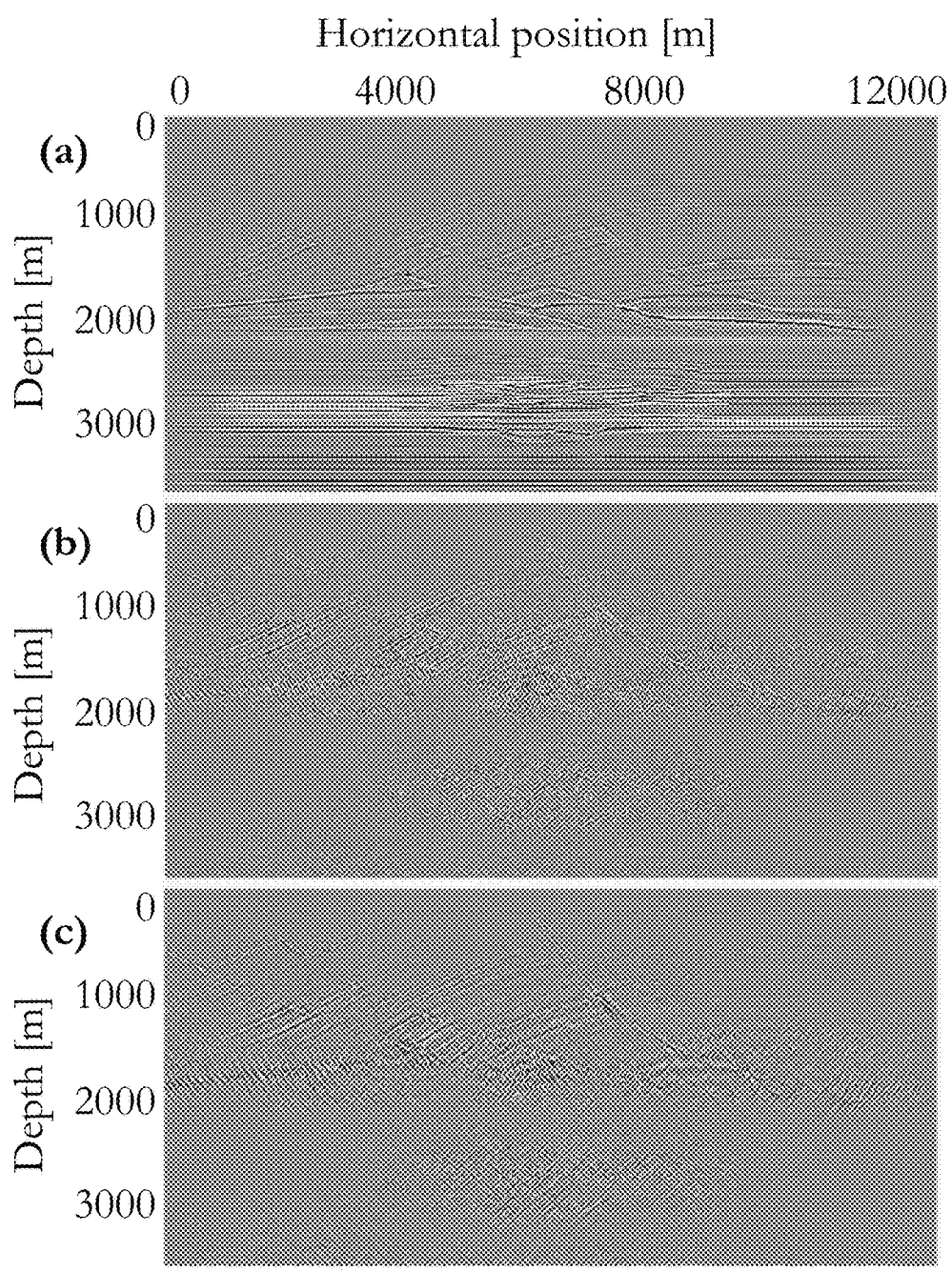
FIG. 10-E

US 10,324,204 B1

DIFFRACTION IMAGING SYSTEMS AND METHODS USING SPECULARITY GATHERS

RELATED APPLICATION DATA

This application claims the benefit of the filing dates of U.S. Provisional Patent Applications Nos. 61/856,231, filed Jul. 19, 2013, and 61/856,225, filed Jul. 19, 2013, which are herein incorporated by reference.

BACKGROUND

The invention relates to systems and methods for geophysical data processing, and in particular to seismic imaging systems and methods.

Generating images of subsurface structures is a key component of the search for oil and gas deposits. Accurate imaging decreases the chances of drilling expensive dry wells, allowing a reduction in the cost of oil exploration and production, and a reduction in dependence on foreign oil.

Kirchhoff migration methods are commonly used for seismic imaging. In Kirchhoff migration, the energy of an event on a trace is propagated to all possible reflection points in the model space. The propagation of the events may be done using methods that are generally related to Green functions. Travel-time tables may be used to characterize the time of propagation from the source defined by the trace to the image point and/or further to the reflector point defined by the trace. After all events on all traces are propagated, an image is generated by stacking (summing) all individual contributions. Stacking reinforces in-phase energy corresponding to true reflectors, and cancels out-of-phase energy that does not correspond to a true reflector.

SUMMARY

According to one aspect, a seismic data processing method comprises employing a computer system comprising at least one processor to: determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude; sum a set of seismic trace amplitudes of the seismic data traces into each of a plurality of specularity bins, each bin being characterized by a range of specularity values; and order the summed trace amplitudes by specularity value to generate a specularity gather characterizing the seismic data traces.

According to another aspect, a non-transitory computer readable medium encodes instructions which, when executed by a computer system, cause the computer system to: determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude; sum a set of seismic trace amplitudes of the seismic data traces into each of a plurality of specularity bins, each bin being characterized by a range of specularity values; and order the summed trace amplitudes by specularity value to generate a specularity gather characterizing the seismic data traces.

According to another aspect, a computer system comprises at least one processor programmed to: determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude; sum a set of seismic trace amplitudes of the seismic data traces into each of a plurality of specularity bins, each bin being characterized by a range of specularity values; and order the summed trace amplitudes by specularity value to generate a specularity gather characterizing the seismic data traces.

BRIEF DESCRIPTION OF THE DRAWINGS

The foregoing aspects and advantages of the present invention will become better understood upon reading the following detailed description and upon reference to the drawings where:

FIGS. 7-A-C show image stacks, parts of specularity gathers corresponding to one vertical section, and parts of specularity gathers corresponding to one specularity value for specularity values of 1.00 (FIG. 7-A), 0.90 (FIG. 7-B) and 0.80 (FIG. 7-C), according to some embodiments of the present invention.

FIGS. 8-A-D show specularity gather data for a point diffractor according to some embodiments of the present invention.

FIGS. 9-A-B illustrate specularity gather data generated using uniform and non-uniform tapering, respectively, according to some embodiments of the present invention.

FIG. 10-A-E illustrate exemplary diffraction images according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
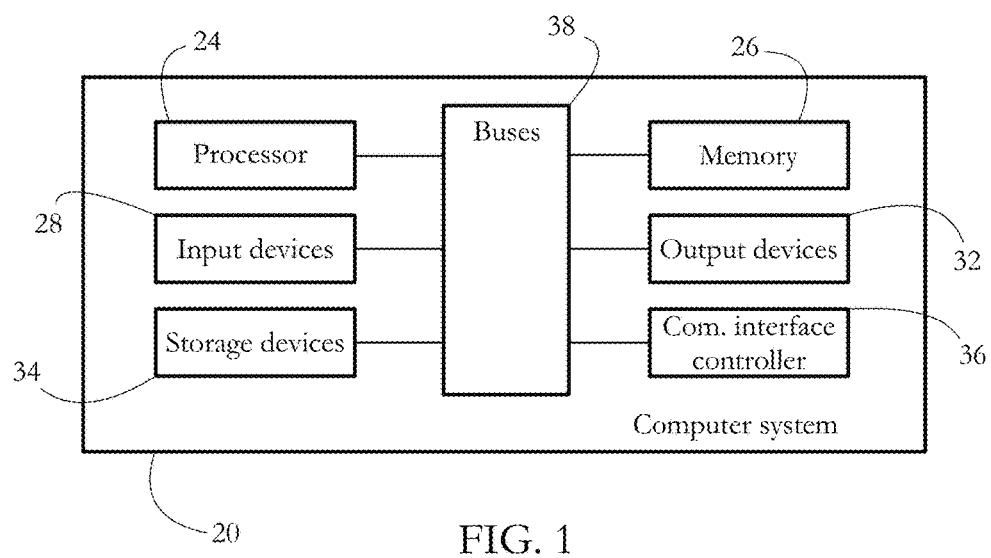
FIG. 1 shows an exemplary hardware configuration of a seismic data processing system according to some embodiments of the present invention.

FIG. 1 shows a hardware configuration of an exemplary computer system 20 according to some embodiments of the present invention. Computer system 20 comprises a processor 24 having one or more processing cores, a random access memory (RAM) 26, a set of input devices 28 (e.g. keyboard, mouse, touchpad), a set of output devices 32 (e.g. monitors, speakers), a set of storage devices 34 (e.g. hard disk drives, solid state drives), and a network interface controller 36, all connected to each other via a set of buses 38. System 20 may be used to implement seismic processing methods as described below.

Diffraction Imaging

Local discontinuities in the Earth's subsurface—generally referred to as reflectors—can be modeled as surfaces, edges or isolated tips or points. In the case of a smoothed surface reflector, the corresponding part of the image is a locally continuous and locally planar surface that is generally referred to as a specular event, and may be described by the local dips, or tangents of the angles made with a horizontal surface, respectively in the 2 vertical coordinate planes. Specular events obey Snell's law. All other events are referred to as diffractive events, and do not obey Snell's law. Diffractive events are generally the seismic responses of small elements (or diffractors) in the subsurface of the earth, such as small scale faults, near surface scattering objects and in general all objects which are small compared to the wavelength of seismic waves. Generally, diffractive events carry information with higher resolution. Since diffractors are smaller than the wavelength of seismic waves, diffraction imaging provides super-resolution information, which includes image details that are beyond the classical Rayleigh limit of half a seismic wavelength. Increasing the resolution allows the seismic data to be used more effectively to characterize and delineate oil and gas reservoirs and to monitor enhanced oil recovery processes, and decreases the probability of making drilling mistakes due to incorrect subsurface image and geo-pressure information.

Diffraction imaging attenuates the relative contribution of specular events in a migration image, thus enhancing the relative contribution of diffractive events. A diffraction angle may be defined as the angle made by the gradient of the travel-time and the normal to the dip of a seismic event. A measure of specularity may be defined with respect to diffraction angle as being proportional to the cosine of the diffraction angle, which is unity for a null diffraction angle and zero for a diffraction angle of 90 degrees. The contribution of a given trace amplitude may be then attenuated by a term proportional to the specularity corresponding to the amplitude. Diffraction imaging need not generally replace traditional migration algorithms, but rather provides interpreters with complementary additional 3-D or 4-D volumes to fill-in small, but potentially crucial, structural details at selected subsurface locations.

Figure 2:
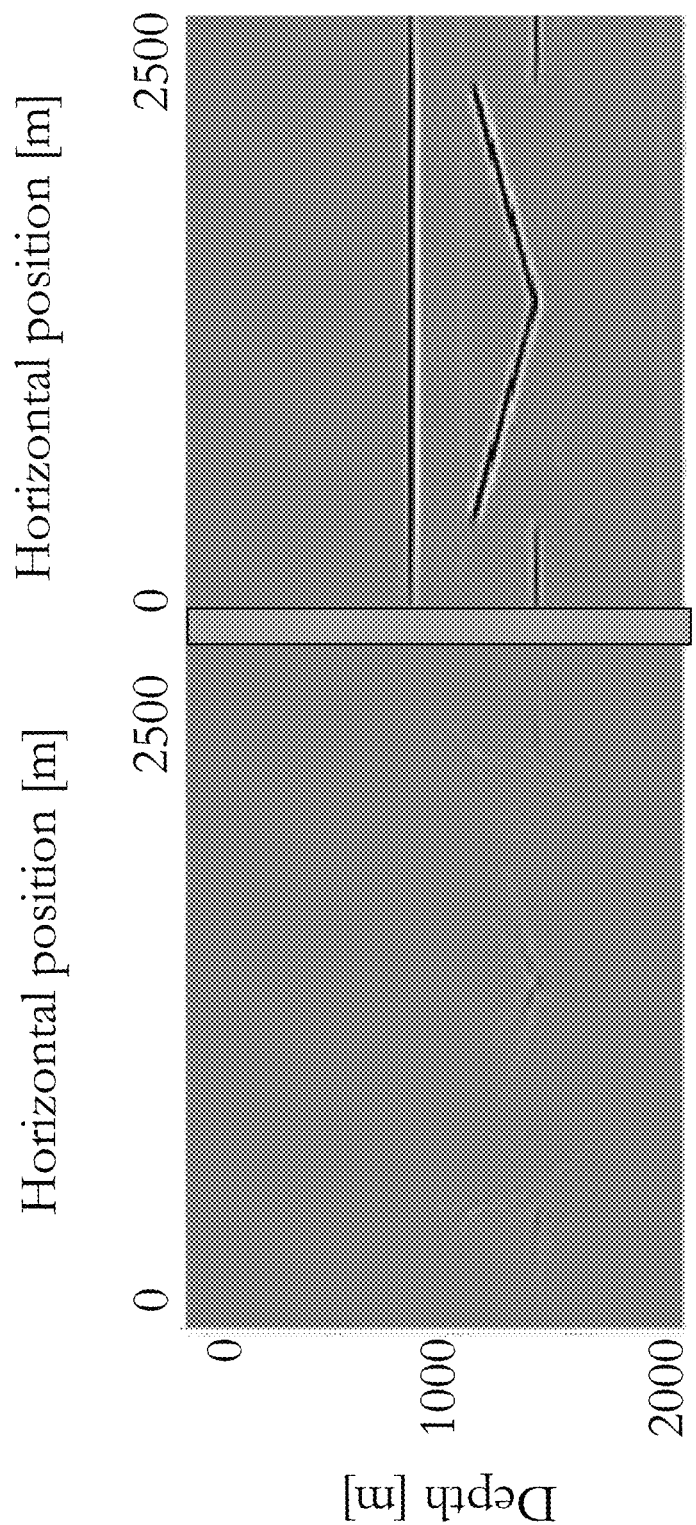
FIG. 2 shows images of exemplary diffraction and specular events, illustrating the relatively-low amplitudes of diffraction events, according to some embodiments of the present invention.

As noted above, a conventional full wave Kirchhoff migration forms a seismic image as a summation (stack) of the seismic events propagated to all possible locations in the subsurface. The propagation may be done using traveltime tables computed using a given subsurface velocity model. The events propagated in locations which correspond to real reflections or diffractions within the subsurface will be summed up coherently, while those propagated in locations where the velocity in the subsurface is not discontinuous will be averaged out. For real reflections/diffractions, there is a quantitative difference between pure (specular) reflections and diffractions. For specular events, two closely-separated events will be propagated in two locations very close to each other. As a result, in the final stack, specular events generally have much higher amplitudes as compared to diffractive ones. The left and right panels of FIG. 2 show separated diffraction and respectively specular events on the same scale. As illustrated, the intensity of the diffraction events is much smaller than that of the corresponding specular events.

Specularity Gathers, Diffraction Imaging Using Specularity Gathers

Figure 3:
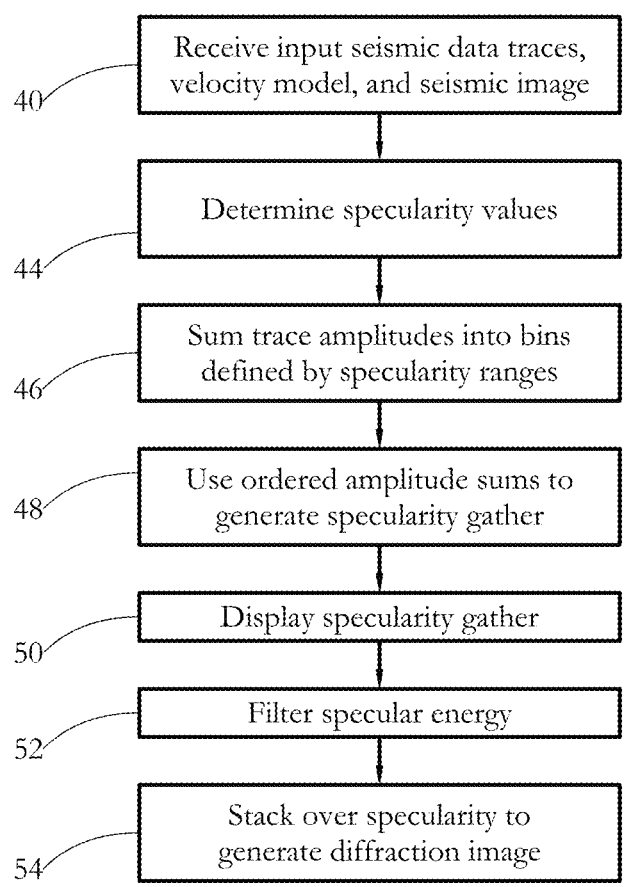
FIG. 3 shows a sequence of steps performed in a seismic data processing method according to some embodiments of the present invention.
Figure 4:
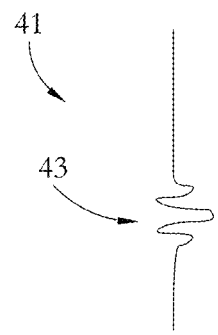
FIG. 4 illustrates a seismic trace according to some embodiments of the present invention.

FIG. 3 shows an exemplary sequence of steps performed according to some embodiments of the present invention. In a step 40, a plurality of input seismic data traces, associated subsurface seismic velocity model, and associated seismic image are retrieved from storage and/or over a communications link. The seismic data traces are the result of a seismic survey conducted using a grid of sources and receivers with known positions overlaying a subsurface volume of interest. The volume of interest may include hydrocarbon (oil/gas) deposits. Common seismic surveys may use seismic sources such as explosives, air guns, and/or thumper trucks, and seismic receivers such as hydrophones and/or geophones. Each trace corresponds to one source and one receiver location. A trace is a time-dependent amplitude of a seismic signal sensed by the receiver in response to a seismic pulse originating at the source. A wavefront originating at the source travels through the subsurface volume of interest and is reflected back toward the receiver by subsurface structures. FIG. 4 shows an exemplary trace 41, and a corresponding exemplary location 43 along trace 41. Location 43 is characterized by an associated amplitude measured by the receiver at a corresponding time. The received seismic image is an image of the subsurface volume of interest generated by conventional imaging method(s) such as Kirchhoff migration. Such a conventional image may include both reflection and diffraction events, and is used to determine local dips as described below.

Figure 5:
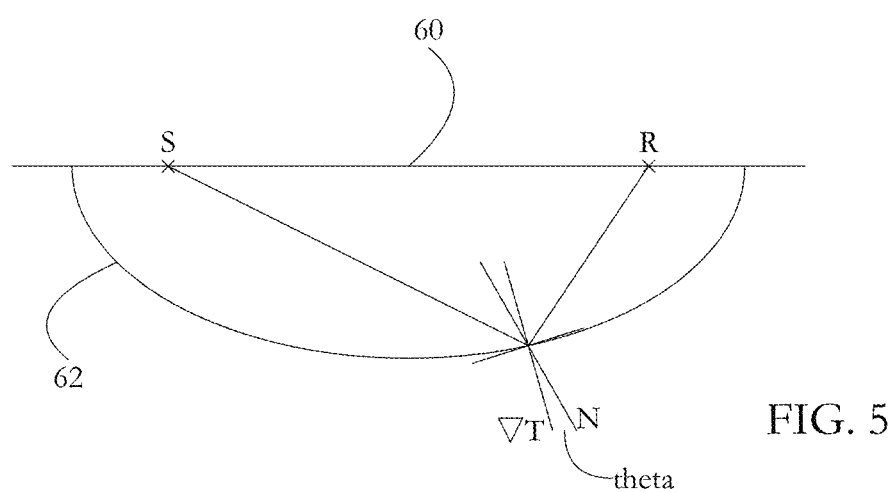
FIG. 5 shows an exemplary diffraction angle formed between a normal to a local surface and a direction of the gradient of the total traveltime, according to some embodiments of the present invention.

In a step 44, a specularity value is determined at each of a plurality of seismic trace locations defined in space and time as described below. FIG. 5 illustrates an exemplary source S and receiver R located on the earth's surface 60, and a corresponding isochrone surface 62 defined by a constant total traveltime from source to receiver given the velocity model below surface 60. In the final image stack, a specular element can be approximated locally as a planar surface, while isochrone surfaces computed using the exact traveltime tables should be tangent to the planar surfaces corresponding to the specular elements. For diffractive events there is no such constraint. A specularity value at a subsurface location and a particular total traveltime value may be determined according to an angle θ defined between a gradient of the total source-receiver traveltime T, and a normal N to a local planar surface defined at the subsurface location in the image received in step 40. The gradient of the total traveltime is normal to the isochrone surface 62. A specularity value may be taken to be proportional to (e.g. equal to) an absolute value of a sinusoid depending on the angle θ, e.g. the cosine of the angle θ, or another function approximating such a sinusoid. If cos(θ) is used, specularity is equal to unity for pure specular events and, as a limit, is equal to zero for diffractive events with a diffraction angle equal to 90 degrees.

In some embodiments, a specularity value may be defined as $$S(s, x, r) = \frac{|n^T T_x|}{\|T_x\|},$$

wherein $T_x$ denotes the gradient of $T(s,x,r)$ with respect to x, s and r denote source and receiver positions, respectively, and n is the unit vector normal to the reflector surface (n depends on x). The gradient of the total traveltime is equal to the sum of the gradients for its source and receiver components, which are aligned, respectively, to the rays coming from the source and going toward the receiver. Consequently, the total traveltime is aligned with the angle bisector of the two rays. If x is located on a strong reflector and the two rays obey Snell's law with respect to the normal to the reflector, the value of specularity should be equal to unity since the angle bisector is aligned with the normal to the surface. If the angle bisector and the normal to the surface are not perfectly aligned, S<1 and the energy is non-specularly scattered.

Figure 6:
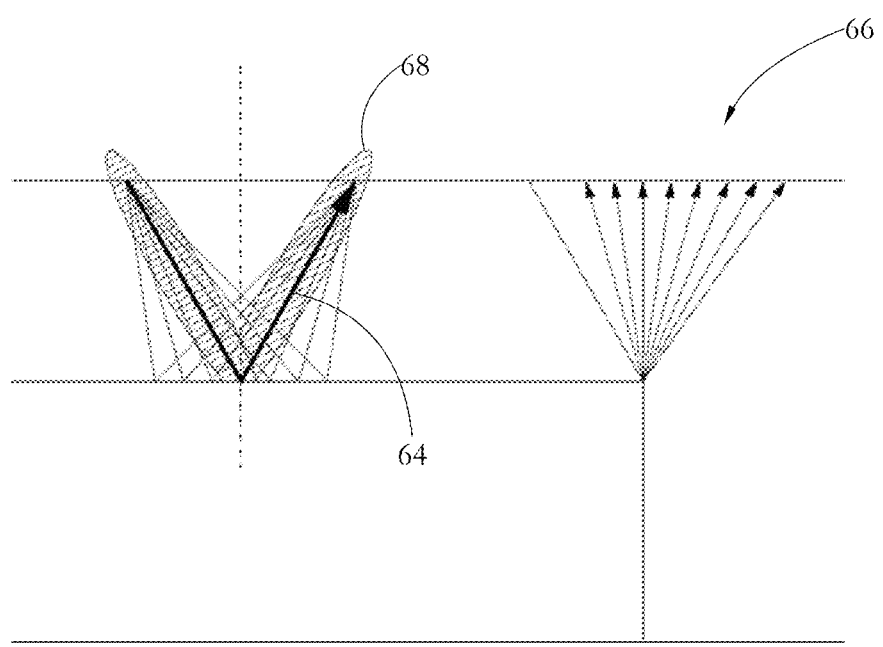
FIG. 6 illustrates a purely specular event, a purely diffractive event, and a Fresnel zone according to some embodiments of the present invention.

FIG. 6 illustrates schematically a purely-specular reflection event 64 and a purely-diffractive event 66. For the diffractive event 66, diffraction of incident energy at the subsurface location of interest generates energy traveling in multiple directions. For the purely specular event 64, reflection of an incident ray yields a single reflected outgoing ray. In some embodiments, specular events may include purely-specular events as well as quasi-specular or partially-specular events as described below. Consider a frequency-dependent area of a reflector from which most of the wave energy is interfering constructively and can be treated as a single arrival wave or as a ray, illustrated by the hatched area 68 in FIG. 6. Such an area is termed below a Fresnel zone. All the points from a Fresnel zone may be considered together, and will have slightly sub-unitary specularity values for specularity. The extent of a Fresnel zone may be determined according to specularity gather data generated as described below.

In a step 46, trace amplitudes are summed into bins defined by specularity ranges. The summation may be an unweighted summation. The summation may also be a weighted summation that attenuates specular events relative to diffraction events as described below with reference to a filtering step 52. Such a relative attenuation may be accomplished by absolutely attenuating specular amplitudes, absolutely amplifying diffractive amplitudes, and/or a combination thereof. In some embodiments, events that are close to the specularity condition as defined by the Fresnel zone are attenuated, while diffractive events (outside the Fresnel zone) are unchanged or amplified. The weight used for specularity suppression may be zero for purely specular events, unity for diffraction events, and may take on a taper value (e.g. a taper value defined by a cubic or other monotonically-varying function) between zero and one for events within the Fresnel zone.

In a step 48, the binned amplitudes are ordered by specularity. The combination of step 46, 48 yields a list of summed amplitudes ordered by specularity, which constitutes the data of a specularity gather (SG). The SG data is used to generate display data in order to display a specularity gather and/or sections of such a gather to a user as illustrated below. FIG. 7-A shows an exemplary final stack 80, a common image gather 82 generated from a specularity gather for a particular x-y coordinate pair (a partial image obtained for a given vertical in the image space and all values of specularity), and a corresponding specularity section 86 generated for a given value of specularity and for all points in the image space, all for a horizontal flat reflector with a constant overburden velocity and a specularity value w=1. FIGS. 7-B-C show similar panels for specularity values of 0.90 and 0.80, respectively. The general patterns illustrated in FIGS. 7-A-B may be observed in real data results in the case of first primaries and can be found in SG results for real data if there are small lateral variations.

In some embodiments, to generate the data of a specularity gather, events are migrated to the proper depth, but are not yet stacked along the migration operator. Rather, the events are partially stacked according to the specularity values in each specularity bin. In a Common Image Point (CIP) section of a SG, the image is obtained from different portions of the isochrones of different traces. For example, in the case of a horizontal flat reflector with a constant velocity overburden, the isochrones are ellipses. The diffraction angle in each point of the ellipse monotonically changes from zero below the Common Mid-Point (CMP) to 90 degrees at zero depth. In a CIP section of the SG, the bin for the maximum specularity (diffraction angle close to zero) is formed by pieces of the ellipses corresponding to maximum depth. Traces with any offset may contribute. The very next bin in the same CIP is formed by the contributions of the traces with neighboring CMP's, but having the right offset to yield the correct value of the specularity. The location of the events should be higher than of the event in the previous bin. The pattern can be applied to subsequent bins, ending with the bin for zero specularity, which includes contributions at zero depth from all traces.

In some embodiments, a specularity gather may be formally expressed as $$V_{sg}(x, S) = \int dt ds dr U''(t, s, r)\delta(t - T(s, x, r))\delta\left(S - \frac{|n^T T_x|}{\|T_x\|}\right),$$

wherein U''(t,s,r) is the second time derivative of the prestack data.

In the case of a point diffractor in a constant velocity medium, the specularity gather in the exact location of the point diffractor is a flat horizontal event. When moving away from this point the horizontal event splits into two events with positive and negative dips, respectively. FIGS. 8-A-D show exemplary results generated for a point diffractor in a constant velocity medium according to some embodiments. FIG. 8-A shows a final stack, specularity gather data at the location of the point diffractor, and a specularity section for specularity w=1. FIG. 8-B shows a final stack, specularity gather data for a location different from the location of the point diffractor, and a specularity section for specularity w=1. FIG. 8-C shows a final stack, specularity gather data at the location of the point diffractor, and a specularity section for specularity w=0.94. FIG. 8-D shows a final stack, specularity gather data at the location of the point diffractor, and a specularity section for specularity w=0.80.

In a step 52 (FIG. 3), a tapering procedure may be used to attenuate specular events in SG data according to specularity values. FIGS. 9-A-B show the result of uniform and non-uniform (depth-dependent) tapering procedures, respectively, according to some embodiments. The right panel in each figure shows the full migration stack, while the left panel shows SG data for a selected location identified by a vertical line in the right panel. In FIG. 9-A, all events with a specularity bigger than a threshold (to the left of a threshold line 90) are attenuated. The selected location characterized by the data of the left panel is shown at 92. FIG. 9-B illustrates depth-dependent tapering, where the events which are identified as diffractors are preserved, while those identified as specular are attenuated in a depth-dependent manner. In FIG. 9-B, all events to the left of the line 94 in the left panel are attenuated. The two events bellow 1000 m are identified as diffractive because they occupy the whole range of specularity values. The top event is identified as specular because it has values only close to specularity w=1. The location (vertical line) characterized by the left panel data is shown at 96 in the right panel of FIG. 9-B.

In a step 54, the data of a specularity gather may be stacked over specularity to generate a diffraction image, as illustrated in FIGS. 2 and 10-A-E. In some embodiments, a diffraction image is generated by a weighted stack over specularity values perform as $$V_a(x) = \int_0^1 dS w(x, S) V_{sg}(x, S).$$

The weighting function w may be spatially-variable (w=w(x,S)) and may be adapted to the local Fresnel zone width, which is difficult to estimate a priori but may be more readily estimated after specularity gathers are assembled.

FIGS. 10-A-E show exemplary diffraction images generated using the Mare di Cassis data set according to some embodiments of the present invention. After regular pre-stack migration, the unit vector normal to the reflectors in the final stack was computed and used to generate a specularity gather in a subsequent migration run. The specularity gathers were tapered along the specularity axis, and a plane wave-destructor (PWD) filter was applied in the common depth sections of the gather to attenuate specular data. FIG. 10-A shows a specularity gather in common-depth display for 2100 m (left panel), and a specularity gather in common-image display for the horizontal position x=4880 m. In FIGS. 10-B-D, the results of applying a plane wave destructor filter on a common depth specularity gather are shown respectively for three values of depth. Unfiltered common-depth SG data are shown in each top panel, while PWD-filtered common-depth SG data are shown in each bottom panel. FIG. 10-B corresponds to a depth of 1310 m, FIG. 10-C to 1960 m, and FIG. 10-D to 2080 m. One can notice that almost all the specular energy is attenuated, except for regions close to S=1 where the dip calculation is affected by either multiple dips concurrently in the same image point or by vertical dips; consequently, the plane wave-destructor filter is not able to clean all the specular energy. FIG. 10-E displays in panel (a) the standard migrated image, in panel (b) the diffraction image obtained by stacking over specu- larities smaller than 0.97 of the plane wave-destructor filtered specularity gather, and, for reference, in panel (c), the diffraction image obtained using a cubic taper to filter out all the events from the specularity gather corresponding to values of specularity bigger than 0.92.

Diffraction Imaging for Time Migration

Kirchhoff time-migration is a specialized and fast migration method used to obtain an image of the sub-surface without wasting computing resources to identify the real value of the depth. The vertical propagation travel-time is used instead as a vertical coordinate in the final image. The method is useful for areas where the elastic properties do not have severe lateral variations, but otherwise have complex structures.

The expression of the total travel-time T as function of the image location given by the horizontal spatial coordinates (x,y) and the vertical coordinate identified with vertical two-way time t is given by the sum of two terms $T_s+T_r$:

$$T(x, y, t; x_s, y_s, x_r, y_r) = \qquad \text{(Eq. 1)}$$
$$\sqrt{\frac{t^2}{4} + \frac{(x-x_s)^2 + (y-y_s)^2}{V_{rms}^2(t)}} + \sqrt{\frac{t^2}{4} + \frac{(x-x_r)^2 + (y-y_r)^2}{V_{rms}^2(t)}} =$$
$$T_s(x, y, t; x_s, y_s) + T_r(x, y, t; x_r, y_r)$$

where $(x_s, y_s)$ and $(x_r, y_r)$ are the horizontal coordinates of the source, respectively the receiver, and $V_{rms}(t)$ is the vertical profile of the root-mean square of the velocity as defined in the location of the middle point between the source and the receiver. Eq. [1] can be modified to handle situations where the locations of the source and receiver depend also on altitude.

The horizontal components of the gradient of the travel-time may be expressed as:

$$\frac{\partial T}{\partial x} = \frac{x - x_s}{V_{rms}^2(t) T_s(x, y, t)} + \frac{x - x_r}{V_{rms}^2(t) T_r(x, y, t)} \qquad \text{(Eq. 2a)}$$

$$\frac{\partial T}{\partial y} = \frac{y - y_s}{V_{rms}^2(t) T_s(x, y, t)} + \frac{y - y_r}{V_{rms}^2(t) T_r(x, y, t)} \qquad \text{(Eq. 2b)}$$

while the vertical component is:

$$\frac{\partial T}{\partial t} = \frac{t - \frac{4[(x-x_s)^2 + (y-y_s)^2]}{V_{rms}^3(t)} \frac{\partial V_{rms}(t)}{\partial t}}{4 T_s(x, y, t)} + \qquad \text{(Eq. 2c)}$$
$$\frac{t - \frac{4[(x-x_r)^2 + (y-y_r)^2]}{V_{rms}^3(t)} \frac{\partial V_{rms}(t)}{\partial t}}{4 T_r(x, y, t)}$$

For the special geometry of time-migration these components of the gradient are not dimensionally consistent: the first two are expressed as time divided by distance, while the third is expressed as time divided by time. In order to have the three components describe the real geometrical situation, we can scale the third time component using a real velocity value, or, in an iterative process, a current velocity value, in order to generate a pseudo-depth measured in the same units (e.g. meters) as the horizontal and vertical distances. A time-migration method may use an approximation of the velocity, i.e. $V_{rms}(t)$, to compute traveltime tables, so a similar approximation may be used for scaling the gradient. In some embodiments, the scaling velocity may be depth-dependent. In some embodiments, if the scaling velocity is V(t), the scaling of the gradient vector is performed according to the relation:

$$\vec{G} = \left(\frac{\partial T}{\partial x}, \frac{\partial T}{\partial y}, \frac{\partial T}{\partial t}\right) \rightarrow \vec{G'} = \left(\frac{\partial T}{\partial x}, \frac{\partial T}{\partial y}, \frac{1}{V(t)}\frac{\partial T}{\partial t}\right) \quad \text{(Eq. 3)}$$

An exemplary diffraction imaging as described above uses an image previously obtained using standard migration in order to extract the dips, which should correspond mainly to specular events. A specular event should obey Snell's law, or equivalently, should have the gradient of the travel-time aligned perpendicular to the local plane defined by the dips. For a diffractive event the direction of the gradient may be arbitrary. If dipx and dipy are, respectively, the components of the reflector dip, a normal to the surface defined by them is:

$$\vec{N} = (-dipx, -dipy, 1) \quad \text{(Eq. 4)}$$

In the time-migration case the first 2 components of the reflector dip are not dimensionally consistent with the $3^{rd}$ one, so a similar scaling procedure as for the gradient of the travel-time may be used:

$$\vec{N} = (-dipx, -dipy, 1) \rightarrow \vec{N'} = \left(-dipx, -dipy, \frac{1}{V(t)}\right) \quad \text{(Eq. 5)}$$

Using the notation above, the pure specularity condition may be written as:

$$\vec{G} \times \vec{N} = \vec{0} \quad \text{(Eq. 6)}$$

Some embodiments of the present invention rely on the observation that the specularity condition of (Eq. 6) is satisfied irrespective of the scaling velocity used in equations 3 and 5, including the limiting cases of no scaling or of scaling using the real velocity. To understand this observation consider the result of porting the transformations of (Eq. 3) and (Eq. 5) into the expression of the cross-product between the gradient and the normal to the reflector dip:

$$\vec{G} \times \vec{N} = \left(\frac{\partial T}{\partial x}, \frac{\partial T}{\partial y}, \frac{\partial T}{\partial t}\right) \times (-dipx, -dipy, 1) = \quad \text{(Eq. 6a)}$$

$$\left(\frac{\partial T}{\partial y} + \frac{\partial T}{\partial t}dipy, -\frac{\partial T}{\partial x} - \frac{\partial T}{\partial t}dipx, \frac{\partial T}{\partial y}dipx - \frac{\partial T}{\partial x}dipy\right) \rightarrow$$

$$\vec{G'} \times \vec{N'} = \left(\frac{\partial T}{\partial x}, \frac{\partial T}{\partial y}, \frac{1}{V(t)}\frac{\partial T}{\partial t}\right) \times \left(-dipx, -dipy, \frac{1}{V(t)}\right) = \quad \text{(Eq. 6b)}$$

$$\left(\left(\frac{\partial T}{\partial y} + \frac{\partial T}{\partial t}dipy\right)\frac{1}{V(t)},\right.$$

$$\left.\left(-\frac{\partial T}{\partial x} - \frac{\partial T}{\partial t}dipx\right)\frac{1}{V(t)}, \frac{\partial T}{\partial y}dipx - \frac{\partial T}{\partial x}dipy\right)$$

Comparing Eqs. 6a and 6b, one can observe that the condition of pure specularity, Eq. 6, is observed irrespective the value of the reference velocity, including the case of scaling factor of value one for time-migration and the case of the exact velocity for depth-migration.

As described above, one can define a diffraction angle of a seismic event produced by a given sample from a trace in a given image point as the angle made by the gradient of the total travel time with the normal to the reflector dip in the image point. The measure of this angle is affected by a scaling like (Eq. 3) and (Eq. 5), and will correspond to a real geometrical angle only for a scaling done with a scaling factor (e.g. the real interval velocity). In order to compute a measure of the diffraction angle using scaled versions of the gradient and of the reflector dip, we can normalize the vectors given in (Eq. 3) and (Eq. 5):

$$\vec{G''} = \frac{\vec{G'}}{\|\vec{G'}\|} \quad \text{(Eq. 7a)}$$

$$\vec{N''} = \frac{\vec{N'}}{\|\vec{N'}\|} \quad \text{(Eq. 7b)}$$

The diffraction angle θ then may be computed using the relation:

$$\theta = a\sin(\|\vec{G''} \times \vec{N''}\|) \quad \text{(Eq. 8)}$$

As noted above, the value zero for the diffraction angle is the same for any scaling velocity used. If a diffraction imaging method targets the attenuation of those events which are close to the perfect specularity condition, and if the scaling velocity thus affects the measure of the diffraction angle in a second order of approximation, then using an approximation for the scaling velocity should produce reasonable results in the proximity of the perfect specularity condition.

As described above, one can define a measure of specularity using the cosine of the diffraction angle:

$$w = \cos(\theta) \quad \text{(Eq. 9)}$$

Specularity is then equal to unity for pure specular events and zero for the diffractive event with diffraction angle equal to 90 degrees. In other embodiments, a measure of specularity may include another sinusoid function (e.g. sine), an approximation of such a function, an offset, and/or other modifications.

As noted above, in some embodiments a weighting procedure is used during the summation of the elementary seismic events to attenuate the events that are close to the specularity condition (as defined by the Fresnel zone), while not changing or enhancing the diffractive ones. One suitable taper function may be a cubic taper function as exemplified below:

$$F(w) = \begin{cases} 1 & \text{if } w < t - s/2 \\ 1 - (3 - 2x)x^2 & \text{if } t - \frac{s}{2} < w < t + \frac{s}{2}, \\ 0 & \text{if } w > t + s/2 \end{cases} \quad \text{(Eq. 10)}$$

$$x = \left[w - \left(t - \frac{s}{2}\right)\right]/s$$

where t is a threshold parameter and s is a parameter describing the smoothness of the taper. A taper as defined above eliminates all the events which have a specularity generally above the threshold, and smoothes artifacts due to possible situations when some events are erroneously placed across the threshold because of errors in either gradient or dip computation.

The main goal of conventional time and depth seismic processing is to enhance specular reflections. There are many time processing steps designed to increase the lateral coherency of the reflections from interpolation, FXY deconvolution and FK filtering, to wave-equation binning. Since diffractions have a different move-out than reflections, many processing steps designed to enhance reflections result in attenuating the diffractions. Seismic methods are generally limited in their resolving power to about one half of the dominant wavelength at the target. If the shale layers are thinner than half the wavelength, tuning and multiple-reverberation effects make the stratigraphic interpretation of the images difficult and unreliable. Decreasing the wavelength of the seismic waves reflected at the target is nearly impossible in surface seismic surveying because of the dissipative nature of the overburden that causes the attenuation of the high-frequency component of the seismic wavefield. Furthermore, the high frequencies that are present in the data are often lost during standard processing. High resolution imaging is of great value to an interpreter, for instance to enable identification of small scale faults and to locate formation pinch-out positions. Standard approaches to obtain high-resolution information, such as coherency analysis and structure-oriented filters, derive attributes from stacked, migrated images. In comparison, diffraction imaging can act directly on the pre-stack data, and has the potential to focus and image super-resolution structural information as a consequence of the redundancy present in the pre-stack data.

It will be clear to one skilled in the art that the above embodiments may be altered in many ways without departing from the scope of the invention. Accordingly, the scope of the invention should be determined by the following claims and their legal equivalents.

What is claimed is:

1. A seismic data processing method comprising employing a computer system including at least one processor to:
   determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude;
   sum a set of seismic trace amplitudes of the seismic data traces into each of a plurality of specularity bins, each bin being characterized by a range of specularity values; and
   order the summed trace amplitudes by specularity value to generate a specularity gather characterizing the seismic data traces.

2. The method of claim 1, wherein the specularity value is proportional to an absolute value of a cosine or sine of the angle.

3. The method of claim 1, further comprising employing the computer system to sum the data of the specularity gather over specularity to generate a diffraction image of a subsurface volume characterized by the seismic data traces.

4. The method of claim 3, wherein summing the data of the specularity gather comprises performing a weighted sum to attenuate a contribution of specular energy relative to diffractive energy.

5. A non-transitory computer-readable medium encoding instructions which, when executed by a computer system cause the computer system to:
   determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude;
   sum a set of seismic trace amplitudes of the seismic data traces into each of a plurality of specularity bins, each bin being characterized by a range of specularity values; and
   order the summed trace amplitudes by specularity value to generate a specularity gather characterizing the seismic data traces.

6. The computer-readable medium of claim 5, wherein the specularity value is proportional to an absolute value of a cosine or sine of the angle.

7. The computer-readable medium of claim 5, wherein the instructions further cause the computer system to sum the data of the specularity gather over specularity to generate a diffraction image of a subsurface volume characterized by the seismic data traces.

8. The computer-readable medium of claim 7, wherein summing the data of the specularity gather comprises performing a weighted sum to attenuate a contribution of specular energy relative to diffractive energy.

9. A computer system comprising at least one processor programmed to:
   determine a specularity value for each of a plurality of amplitudes of a plurality of seismic data traces, wherein determining the specularity value for a seismic trace amplitude is performed according to an angle between a normal to a local reflector and a gradient of a total source-receiver traveltime corresponding to the seismic trace amplitude;
   sum a set of seismic trace amplitudes of the seismic data traces into each of a plurality of specularity bins, each bin being characterized by a range of specularity values; and
   order the summed trace amplitudes by specularity value to generate a specularity gather characterizing the seismic data traces.

10. The computer system of claim 9, wherein the specularity value is proportional to an absolute value of a cosine or sine of the angle.

11. The computer system of claim 10, wherein the at least one processor is further programmed to sum the data of the specularity gather over specularity to generate a diffraction image of a subsurface volume characterized by the seismic data traces.

12. The computer system of claim 11, wherein summing the data of the specularity gather comprises performing a weighted sum to attenuate a contribution of specular energy relative to diffractive energy.

13. The method of claim 1, wherein the specularity gather comprises summed data arranged by specularity along a first axis, and arranged by depth along a second axis.

14. The computer-readable medium of claim 5, wherein the specularity gather comprises summed data arranged by specularity along a first axis, and arranged by depth along a second axis.

15. The computer system of claim 9, wherein the specularity gather comprises summed data arranged by specularity along a first axis, and arranged by depth along a second axis.

* * * * *